United States Patent
Chupp

[15] 3,644,993
[45] Feb. 29, 1972

[54] EDGE-TRIMMING DEVICE

[72] Inventor: Leland Chupp, 210 South 23rd St., Goshen, Ind. 46526

[22] Filed: Feb. 9, 1970

[21] Appl. No.: 9,551

[52] U.S. Cl.....................................30/280, 30/294, 145/6
[51] Int. Cl.....................................B26b 29/00
[58] Field of Search....................30/278, 280, 283, 289, 294; 145/6

[56] References Cited

UNITED STATES PATENTS

| 310,349 | 1/1885 | Wicks.....................................145/6 |
| 317,092 | 5/1885 | Clifford...................................145/6 |

FOREIGN PATENTS OR APPLICATIONS

| 205,789 | 10/1924 | Great Britain............................145/6 |

Primary Examiner—Theron E. Condon
Attorney—Oltsch & Knoblock

[57] ABSTRACT

A device for trimming the edge of an object, such as an article of manufacture, including a hand-held guide member having an object-engaging part and a grip part. The object-engaging part of the guide member has a longitudinal groove formed therein which conforms in cross section generally to the shape of the object at the edge thereof. The grip part has a transverse groove formed therein which intersects the longitudinal groove in the object-engaging part. A cutting blade is disposed within the transverse groove of the grip part and is anchored to the guide member. The cutting blade protrudes into the longitudinal groove of the object-engaging part with its cutting edge so positioned that as the object-engaging part is positioned over the edge of the object and slid therealong, the cutting edge will engage a portion of the edge and remove it.

6 Claims, 6 Drawing Figures

Patented Feb. 29, 1972
3,644,993
2 Sheets-Sheet 1
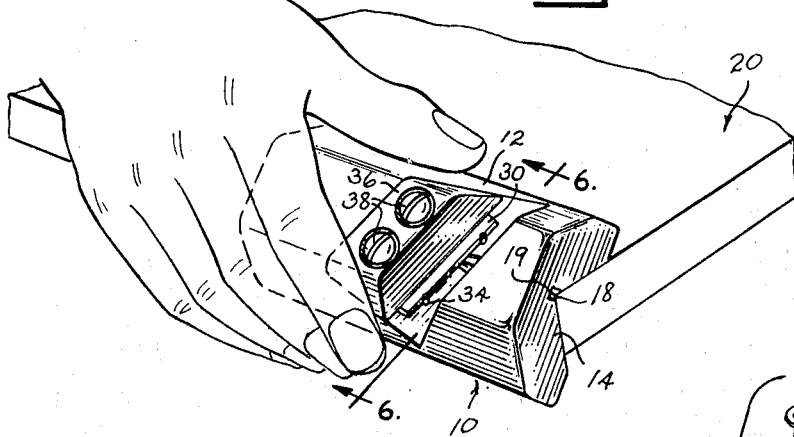
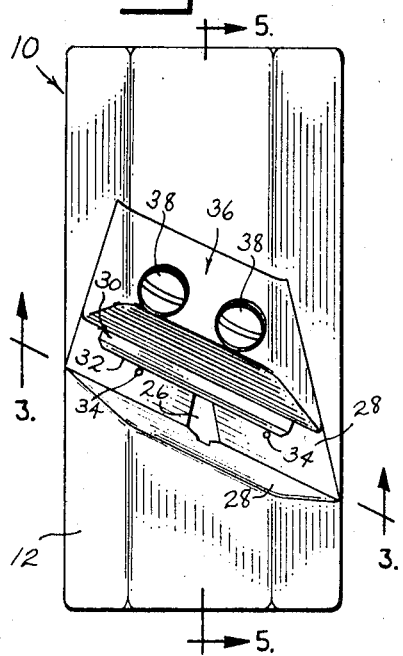
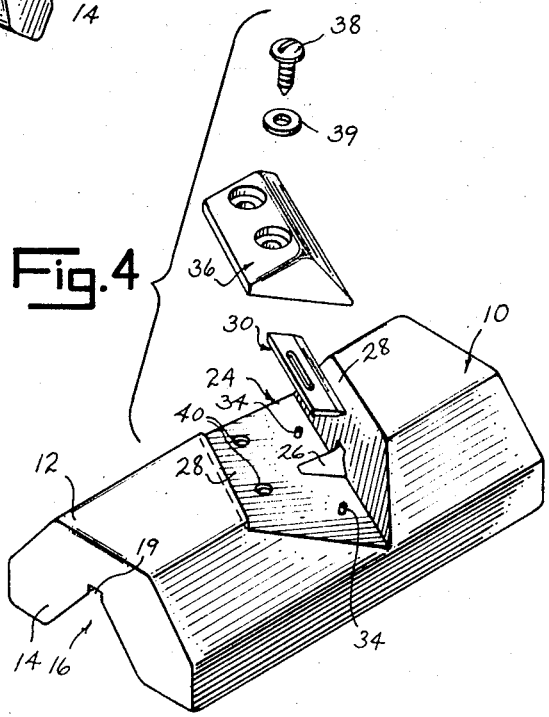
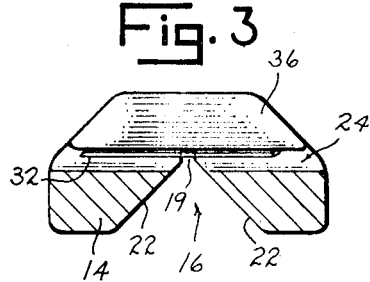
INVENTOR.
LELAND CHUPP
BY Oltsch & Knoblock
ATTORNEYS Patented Feb. 29, 1972
3,644,993
2 Sheets-Sheet 2
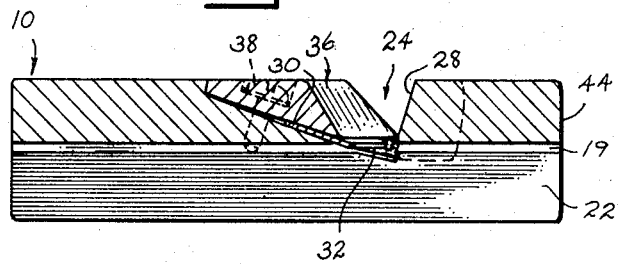
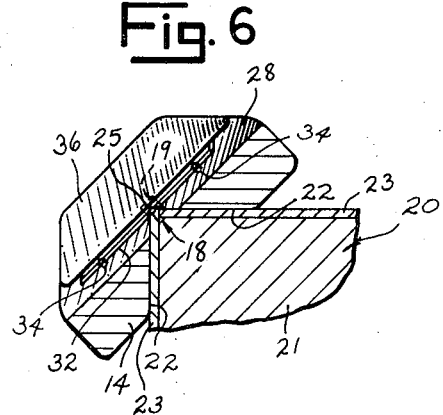
INVENTOR.
LELAND CHUPP
BY
Oltsch & Knoblock
ATTORNEYS

EDGE-TRIMMING DEVICE

SUMMARY OF THE INVENTION

This invention relates to a device for trimming the edges of an object and as such would have application in the trimming and finishing of furniture and cabinets.

The trimming device of this invention includes a guide member, adapted to be held by the hand, having an object-engaging part and a grip part. The object-engaging part of the guide member has a longitudinal groove formed therein which in cross section conforms generally to the shape of the object at the edges thereof. The grip part of the guide member preferably has a transverse groove formed therein which intersects the longitudinal groove in the object-engaging part of the guide member at the edge-engaging portions thereof. A cutting blade is disposed within the transverse groove and is anchored to the guide member. The blade is positioned with its cutting edge protruding into the longitudinal groove so that, as the object-engaging part is positioned against the object with a selected edge thereof received complementally within the longitudinal groove, the cutting edge of the blade will engage the selected object edge. As the guide member is slid along the object, the blade removes a portion of the edge.

The device of this invention will find application in the cabinet and home and office furniture manufacturing fields. Due to the scarcity of some types of wood and for the purposes of durability and economy, it is becoming a practice in the furniture manufacturing industry to apply wood-simulating sheets of plastic or similar material to the outer surfaces of pressed or low-grade wood. The edges thus formed in applying such sheet material to the wood base generally include some overlap of sheet material which must be removed in order to provide a finished-looking piece of furniture. It has heretofore been the practice in applying sheeting to such items as table tops to utilize two skilled workmen for hand trimming the furniture edge for every single workman who applies the sheeting. With the trimmer of this invention, an unskilled workman can accomplish, in a given time, the same amount of work with more consistent results than two skilled workmen using ordinary trimming means, such as knives. By utilizing the trimming device of this invention, the edge-trimming operation in the manufacture of furniture can be completed in an efficient manner which materially contributes to the quality of the finished product.

Accordingly, it is an object of this invention to provide a device for trimming the edges of articles of manufacture in an efficient, labor-saving manner.

It is another object of this invention to provide a trimmer for removing excess material from the edges of laminated furniture tops.

It is another object of this invention to provide a device for trimming the edges of articles of manufacture which is of economic construction and of simple operation.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is a perspective view of the trimming device of this invention shown in use.

FIG. 2 is a top plan view of the trimming device shown in FIG. 1.

FIG. 3 is a sectional view taken along line 3—3 of FIG. 2.

FIG. 4 is a perspective view of the trimming device shown in FIG. 1 with parts thereof in exploded form.

FIG. 5 is a longitudinal sectional view taken along line 5—5 of FIG. 2.

FIG. 6 is a sectional view of the trimming device shown in use and seen from line 6—6 of FIG. 1.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The preferred embodiment illustrated includes elongated guide member 10 which is generally semicylindrical in shape and which is adapted to be gripped by the hand. Guide member 10 includes a handgrip part 12 and an object-engaging part 14 having a longitudinal groove 16 extending the length of the guide member. Groove 16 is designed to generally conform to the shape of the object at the edge thereof which is selected for trimming. Thus, when the trimming device of this invention is used to trim a right angular edge 18 of a tabletop 20, as shown in FIGS. 1 and 6, longitudinal groove 16 will include right-angular sidewalls 22. It is to be understood that, if the sides of top 18 were undercut or beveled, sidewalls 22 of groove 16 would be similarly angled. Longitudinal groove 16 is enlarged at the edge-engaging portion 19 thereof. Enlargement 19 in groove 16 preferably extends the full length of guide member 10.

Grip part 12 of guide member 10 preferably has a transverse groove 24 formed therein. Groove 24 intersects enlargement 19 of longitudinal groove 16 and preferably protrudes slightly into the remaining portion of groove 16 as shown in FIG. 3 so as to provide an opening 26 between grooves 16 and 24. Transverse groove 24, which preferably extends obliquely across guide member 10, is generally V-shaped and has sidewalls 28. A cutting blade 30 is disposed within groove 24 with its cutting edge 32 protruding into opening 26 and into longitudinal groove 16. Blade 30 is positioned against one sidewall 28 with the cutting edge 32 of the blade being angled relative to groove 16. Blade 30 rests upon spaced pins 34 located in the blade-engaging sidewall 28 with its cutting edge 32 preferably positioned by pins 34 within groove enlargement 19 and located at the line of intersection of the planes of the sidewalls 22 of groove 16. A blade retainer part 36 is placed over the butt portion of blade 30 and is attached to the blade-engaging sidewall 28 by means of screws 38 which extend through the retainer part and are turned into threaded bores 40 in guide member 10. A washer 39 may be positioned between the head of each screw 38 and retainer part 36. Retainer part 36 serves to hold the blade against the guide member and locating pins 34. When blade 30 dulls and it is necessary to change blades, screws 38 need only be loosened and the old blade 30 slipped from under the retainer part and a new blade inserted in place.

Table top 20 consists of an inner rigid top part 21 over which sheet material 23 is bonded. Enlargement 19 in groove 16 is provided to accommodate, as shown in FIG. 6, the excess sheet material 25 at edge 18 which is to be removed by the trimming device. The importance of enlargement 19 cannot be overemphasized since, in order for blade 30 to cleanly remove the excess sheet material at edge 18 during use of the trimming device, it is necessary for such sheet material to remain extended and not crimped or folded against top 20 when the guide member is placed over the edge. Although it is preferable for enlargement 19 to extend the full length of groove 16, it would only be necessary for the enlargement to extend from front face 44 of guide member 10 to opening 26 therein.

To operate the trimming device of this invention, guide member 10 is placed over a selected edge 18 of table 20 with the top and side surfaces of the table top contacting against sidewalls 22 of longitudinal groove 16. The guide member is then held against the tabletop and pushed forwardly along edge 18 by the user with cutting edge 32 of blade 30 engaging and causing the removal of excess sheet material 25. As excess sheet material 25 is removed from edge 18, it passes upwardly through hole 26 and over blade retainer part 36 so as not to interfere with the cutting action of the trimming device. The cutting blade of the trimming device is positioned in such a manner that the user of the device will not be cut or injured during the trimming operation.

It is to be understood that the invention is not to be limited to the details herein given, but may be modified within the scope of the appended claims.

What I claim is:

1. A device for trimming the edge of an object comprising: a guide member including an object-engaging part and a handgrip part, said object-engaging part having a longitudinal groove therein which conforms generally to the shape of said object at said edge, said guide member having a transverse groove therein intersecting said longitudinal groove at the edge-engaging portion thereof, a cutting blade disposed within said transverse groove and attached to said guide member, means positioning said blade with its cutting edge protruding into said longitudinal groove and disposed at an oblique angle to said longitudinal groove so as to make cutting engagement with said edge as said object-engaging part as placed over said edge and positioned against said object and the guide member slid along said edge, said longitudinal groove having an enlarged part extending longitudinally along the edge-engaging portion thereof and forwardly of said blade, said enlarged part defining means for accommodating that portion of said edge which is to be removed by said blade as the guide member is slid along said edge.

2. The trimming device of claim 1 wherein said transverse groove extends obliquely across said handgrip part and is generally V-shaped and defined at least in part by convergent sidewalls, said blade being attached to one of said sidewalls.

3. The trimming device of claim 1 and means positioning the cutting edge of said blade within the enlarged part of said longitudinal groove.

4. The trimming device of claim 1 wherein said guide member includes a forward end and said enlarged part of the longitudinal groove extends forwardly of said blade to said forward end of the guide member.

5. A device for trimming the edge of an object comprising: a guide member including an object-engaging part and a hand grip part, said object-engaging part having a longitudinal groove therein which conforms generally to the shape of said object at said edge, said guide member having a beveled wall portion intersecting said longitudinal groove at the edge-engaging portion thereof, said guide member having a front end face with said wall portion located rearwardly of said front end face, a cutting blade positioned against said wall portion and attached to said guide member, said blade having its cutting edge protruding into said longitudinal groove so as to make cutting engagement with said edge as said object-engaging part is placed over said edge and positioned against said object and the guide member slid along said edge, said longitudinal groove having an enlarged part extending longitudinally along the edge-engaging portion thereof forwardly of said blade to said front end face, said enlarged part defining means for accommodating that portion of said edge which is to be removed by said blade as the guide member is slid along said edge.

6. The trimming device of claim 5 wherein said enlarged part extends the length of said longitudinal groove.

* * * * *